Oct. 28, 1941.  R. W. ERWIN  2,261,057
EMULSION TREATING AND BRINE INJECTION SYSTEM FOR OIL WELLS
Filed July 15, 1940  4 Sheets-Sheet 4

Ransome W. Erwin
INVENTOR.
BY John M. Spellman
ATTORNEY

Patented Oct. 28, 1941

2,261,057

UNITED STATES PATENT OFFICE 2,261,057

EMULSION TREATING AND BRINE INJECTION SYSTEM FOR OIL WELLS

Ransome W. Erwin, Longview, Tex., assignor to Salt Water Control Inc., Fort Worth, Tex., a corporation Application July 15, 1940, Serial No. 345,688

15 Claims. (Cl. 166—1)

This invention relates to improvements in emulsion treating and brine injection systems for oil wells.

In my co-pending application Ser. No. 404,094 I have described a somewhat different specific embodiment of the brine injection system from what is herein disclosed, and in that application I have included claims generic to both embodiments of the invention.

In my application Ser. No. 404,095, I have described an emulsion treating apparatus similar to that disclosed in the present application, and in that application I have included claims for the emulsion treating apparatus per se.

In my present application I have claimed the combined emulsion treating and brine injection system and also the particular form of brine injection or liquid disposal apparatus disclosed in the present application.

One of the primary objects of the invention is the provision of emulsion treating apparatus in which the long-used and well-established principles of heat treatment, hot water washing, baffling, dispersion, excelsior filtering, metal walled heat exchange between two liquids, and timed settling are utilized to break oil-water emulsions in the petroleum as it flows or comes from a well. A further object is to remove the water from the oil, once it is broken from the emulsion state, and to deliver the oil containing less than 1.0% emulsion or salt water to stock tanks, the oil being cooled as much as possible within the economical bounds of normal heat exchange methods. A further object is to automatically discharge the treated-out water from the system in a substantially oil-free and clean condition. According to my invention all of the above operations are preferably carried out with the use of a minimum quantity of fuel and emulsion breaking chemicals, as well as with a minimum of attention and maintenance. A further object is to accomplish the preceding operations with a pressure of at least 20 pounds per square inch on the whole system, and to exclude air, oxygen, algae, bacteria, and any other atmospheric agency from the system (or to do the same with as much as 5 inches of vacuum on the system).

A further object of the invention is to maintain maximum A. P. I. gravity of the oil possible under conditions of heating and washing, and to salvage all weathered vapors from the system by returning them to the casing head gasoline plant's vacuum line.

The invention also contemplates the use of a gas separating chamber in association with emulsion treating apparatus or equipment for the purpose of separating gases and vapors from the incoming mixture of gases and liquids as thoroughly as is possible, gas being returned to the casing head plant's gathering vacuum line, and a gas-free mixture of oil, salt water and emulsion being delivered to a treating system for further processing.

Another important object of the invention is the provision of a special water processing vessel for the purpose of removing automatically any oil that might accidentally pass out of the emulsion treating vessel or equipment with the water, including baffling means for precipitated sludge removal, and a filter section for the removal of any insoluble matter.

Included in the system is a specially designed and operative valve or hydraulic bottom tubing valve, the primary object of which is to assure constant maintenance of a completely filled string of tubing that will permit passage of water only when the valve is actuated by a float control.

With the above and other objects in view, the invention will be more readily understood from a perusal of the following detailed description, taken in connection with the accompanying drawings which are intended as illustrative of the inventive thought involved.

Figure 1:
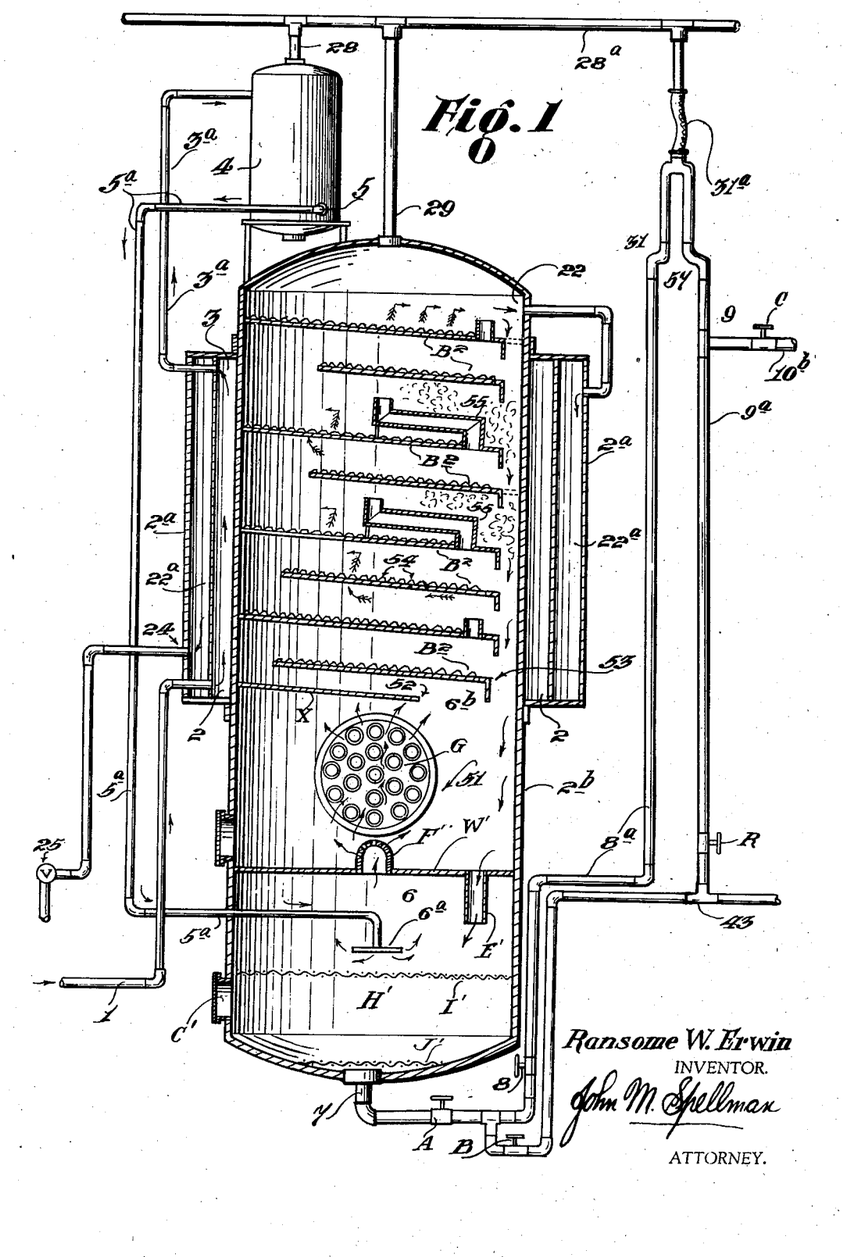
Fig. 1 is a vertical sectional view of the emulsion treating chamber or tank, showing also the gas separating chamber, both chambers being connected into the flow line of the system.
Figure 2:
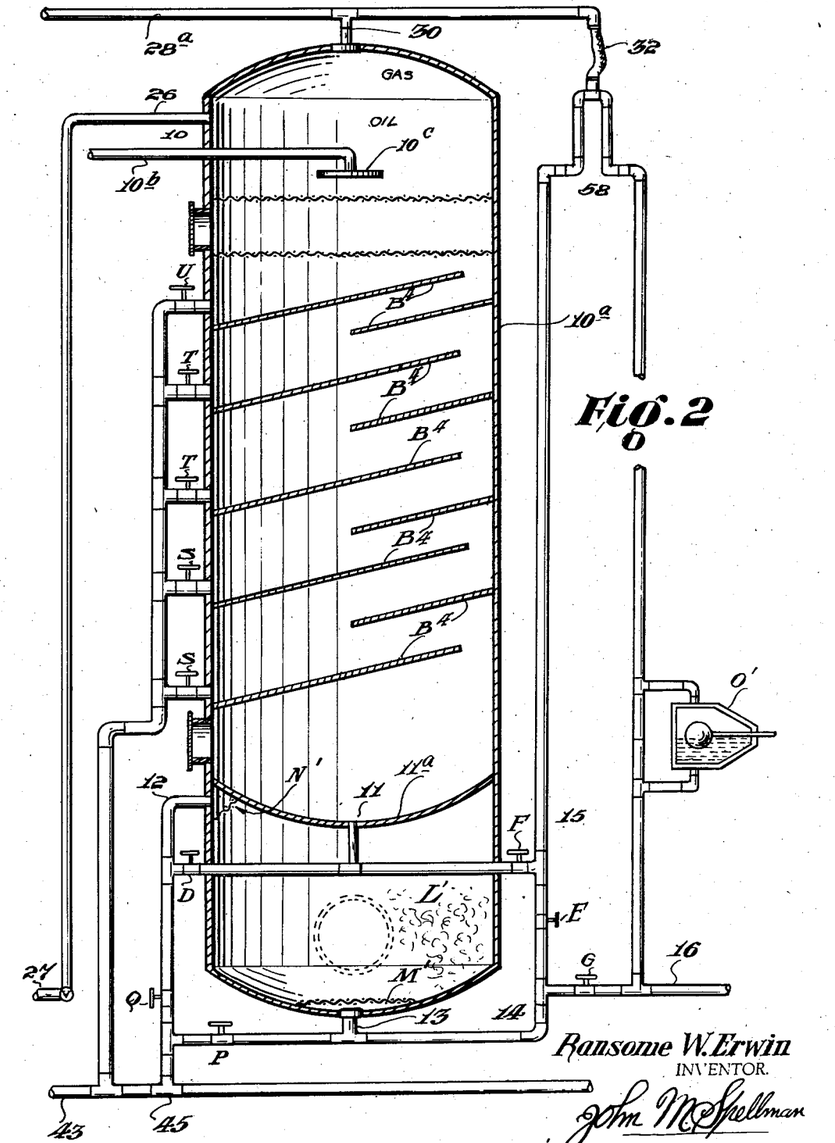
Fig. 2 is a vertical sectional view of the main water processing tank, showing a continuation of the flow line connected thereto.
Figures 3, 4:
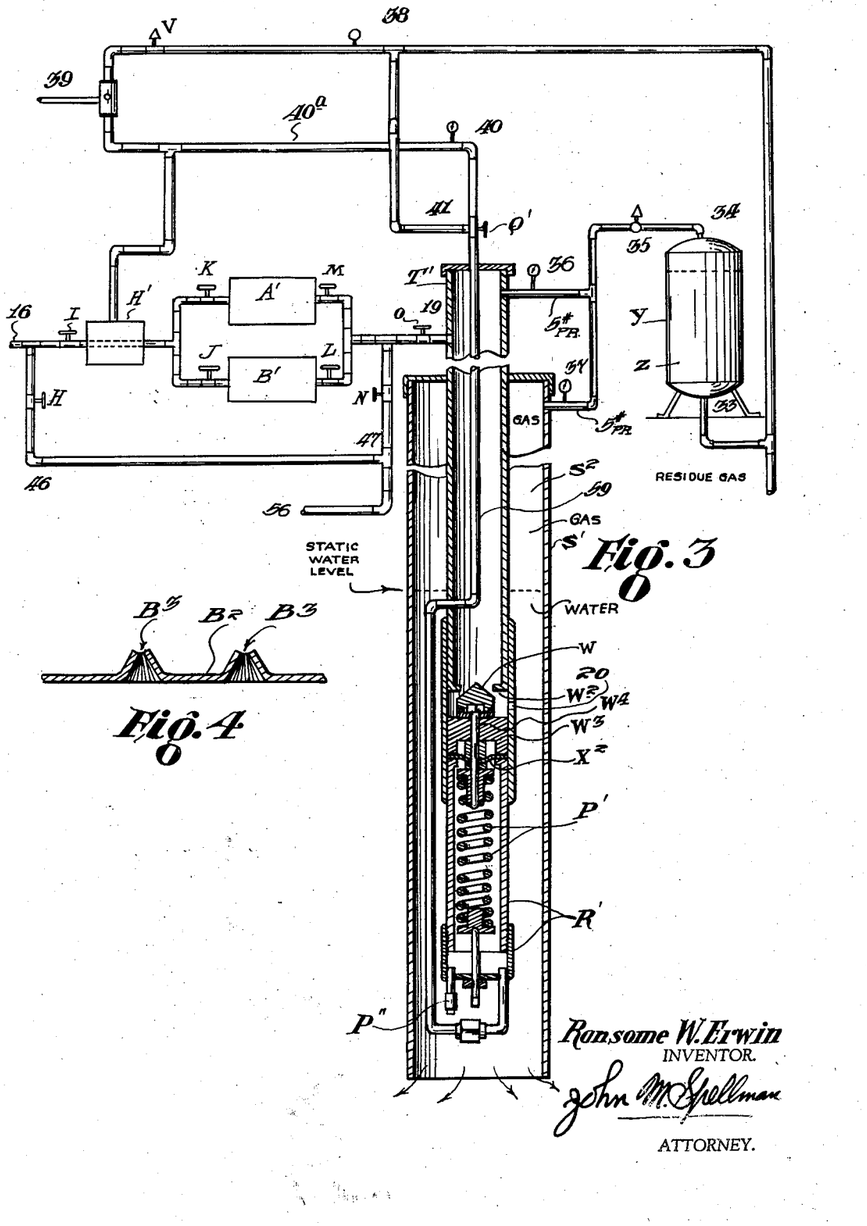
Fig. 3 is a vertical sectional view of a special hydraulic bottom valve with connected flow line and other parts, the view being partly diagrammatic.
Fig. 4 is a sectional detail view of one of the baffles of special design employed in the emulsion treating chamber.

It will be understood that Figs. 1, 2 and 3 are to be read together as constituting the complete system, and the elements of the apparatus are connected by suitable tubing.

In accordance with the drawings and referring particularly to Fig. 1, a mixture of oil, water, emulsion and gas enters the system directly from the well through the pipe 1. It enters the inner annular space 2 of a heat exchange jacket 2a of an emulsion treating tank or vessel 2b, passes up through this space, completely around the jacket and makes its exit at 3 through the pipe 3a.

Figure 6:
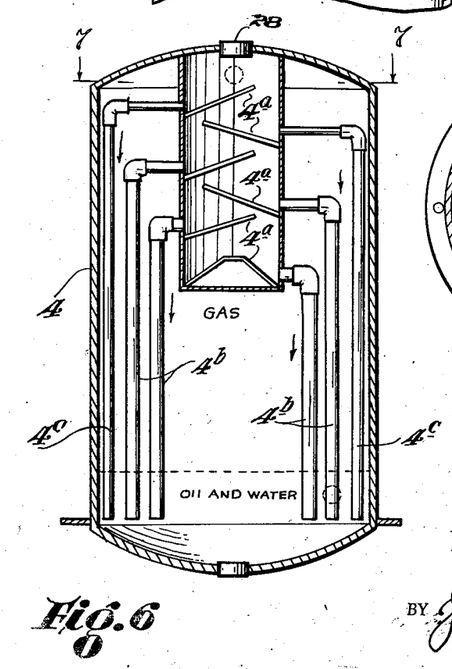
Fig. 6 is a vertical sectional view of the gas separating chamber, shown in Fig. 1.
Figure 7:
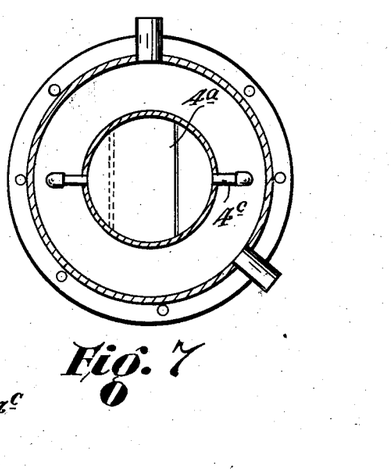
Fig. 7 is a cross sectional view of the gas separating chamber on line 7—7 of Fig. 6.

The preheated mixture then passes into an oil and gas separating chamber at 4, the arrows indicating the direction of the flow. Here the gas is scrubbed from the oil and completely separated by the specially constructed baffles 4a, shown in Fig. 6, which allow oil droplets scrubbed from the gas to work down the upward side of each baffle, being driven along by the gas down into the lower recess that leads into the pipes 4b, the pipes 4c of which are of smaller diameter. These pipes drain the oil down beneath the surface level of the oil in the bottom of the separating chamber 4. The gas leaves the separating chamber through an outlet 28 at the top, where it enters the gasoline plant's vacuum line 28a.

The oil, water and emulsion leave the lower portion of the separating chamber at 5 through the pipe 5a whence the mixture flows into the bottom of the emulsion tank 2b where it enters a free water removing and heat salvaging chamber 6 through a spreader 6a of any preferred type. The element 6a spreads the oil, emulsion and water out, enabling it to intermingle with the hot water from the hot treating chamber 6b above, the heat and spreading bringing about the removal of a considerable portion of the free water contained in the oil. This free water, together with the water treated out of the oil in the upper chamber, by heating and baffling, then passes through a filter section indicated at H' and makes its exit at the outlet 7, whence it passes through pipes 8 and 8a to an adjustable syphon indicated at 57. If it is desired to bypass this syphon for any reason, and send the water directly to an auxiliary pit, then valve B and valve A should be opened. If the water is to pass upwardly through the pipe 8a to the syphon 57, then valve A should be opened and valve B be closed. If the water is to go through the syphon and then to the pit, rather than into the water injection system, shown in Figs. 2 and 3, then a valve C in outlet pipe 10b should be closed, the water leaving at point 9, through the pipe 9a, and passing downwardly to the pipe 43 through an open valve R. If the water is to go into the injection system, then valve R must be closed and the valve C opened, allowing water to enter the main water processing tank or chamber 10a at the point 10, through the pipe 10b.

Figure 5:
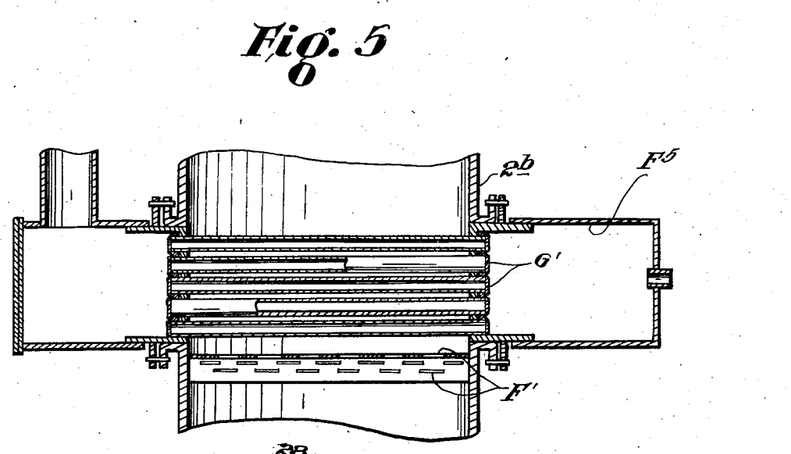
Fig. 5 is a detailed fragmentary vertical sectional view of the fire box and flues in the lower part of the emulsion treating chamber, the section being at right angles to the section in Fig. 1.

Referring again to the course of the oil, the mixture of oil, emulsion and what water failed to settle out in the free water removing and heat salvaging zone 6, leaves this zone travelling upwardly because it is lighter than the surrounding water, and accumulates beneath a partition W' which feeds it into a spreader F' (Figs. 1 and 5). Then it passes through a battery of fire tubes G', at the point 51, thence upwardly to the plate X which acts to temporarily check the movement of the oil, allowing it to be longer contacted with hot water thus permitting more of free water to settle out of the mixture.

From this point the oil moves upwardly over the edge of the plate X at 52, whence it is introduced to a series of specially perforated and arranged baffles indicated at $B^2$. These perforated baffles include teat-like projections $B^3$ (Fig. 4), and part of the oil passes through these perforations as shown at point 54 all along the baffle, the excess not handled by the perforations moving on upwardly and out at the upper ends of the baffles. Once through the baffles, the oil is broken into fine streamlets that promote the breakage of the emulsion and removal of water from the oil (with the aid of emulsion breaking chemicals if necessary or desirable). The oil then strikes the next plate or baffle above, similarly perforated, but which dips downwardly, acting to hold or check excess oil as was done by the first baffle, the surplus not handled by the perforations passing downwardly and out through conduit pipe 55 where it is introduced into the midst of a mass of excelsior or like material contained in this section and in the two sections above it for the purpose of breaking up the remainder of the emulsion and removing remainder of the free water contained in the oil. It should be noted that the special arrangement of perforations in the baffles is unique for the purpose so far as the inventor is aware, and allows the oil to move upwardly through them at all points on the baffles, thereby insuring thorough introduction of oil into excelsior sections which is conducive to thorough removal of free water from the oil, at the same time being designed so that water cannot flow counter-currently back through the perforations against the oncoming stream of oil. Thus the water, indicated by the non-feathered arrows, works its way back down between the streamlets of oil from the perforations, on down onto the top side of the baffles, where it is able to gravitate down the upper side of the baffles on the space between the special perforations and down and over bent edge of the plate at the point 53 which introduces it into the downward water passage, at the edge of the tank, the bent down edges of the baffles preventing countercurrent flow of oil upwardly against the water. The feathered arrows indicate the course of the oil.

By the arrangement above described the oil is reduced to 1.0% or less water and emulsion by the time it reaches the outlet point 22 near the top of the tank whence it flows by gravity down into the outer shell or annular space 22a of the heat exchange jacket 2a. The oil passes down this annular space of the outer shell of the heat exchanger giving up its heat to the incoming fluid in the inner shell, completely around the shell and passes out at the point 24, then down into level control valve 25 which automatically keeps the outer jacket full of leaving treated oil. The oil then flows from the valve 25 to stock tanks. The water removed from the oil in the perforated baffle section flows downwardly through the conduit pipe E' in the partition W, where it mingles with incoming untreated fluid in the free water removing and heat salvaging chamber 6. Thus is the gas, oil, emulsion and water handled in the emulsion treating system.

Any sand, mud or other insoluble matter that may be contained in the incoming fluid entering chamber 6 through spreader 6a will be deposited on top of the screen I' and in filter section H'. Screen J' keeps the filter medium from being carried out with the water from the system. A manhole C' is provided for the purpose of permitting access to section H'.

Any weathered vapors that the oil will not hold at the operating temperatures and pressures of the treating system are drawn off from the top of tank 24 and 29 and salvaged by the vacuum line 28a of the casing head gasoline plant. The adjustable syphon 57 is equalized with the gas pressure in the treating system by means of a flexible connection 31a. This syphon maintains a predetermined desired oil-water level in the treating system.

It should be noted that the jacketed shell heat exchanger and insulator, the free water removing and heat salvaging chamber at the bottom of the unit 2b, and the oil and gas separating chamber on top of the unit while desirable, are not absolutely essential to the successful operation of the treater proper, even though they greatly enhance its operation, and all or any of these may be omitted if the purchaser of the equipment should see fit, using equipment already on hand for these functions.

Continuing the description of the system as a whole, in Fig. 2 is shown the main water processing unit 10a, connected to the treater syphon 57 shown in Fig. 1 through the pipe 10b, being introduced into the tank 10a through a conventional type spreader 10c. Any droplets of oil that might be accidently carried over with the water from the emulsion treating tank float to the surface in the tank 10a where they accumulate. This oil accumulation may be removed by gravity through an opening which connects with a pipe 26 whence it passes down into a control valve 27, similar to the valve 25 in the oil outlet pipe leading from the emulsion treater. This oil may be returned back to the stock tank, or may be connected to a separate tank provided with a syphon to take care of any water that would have to pass through this outlet in case some emergency dictated that no water enter the injection well. The water leaves the spreader and passes down through the baffles B⁴ where any coagulated sludge that may have formed will have a chance to settle out in the lower dips of the plates, this sludge being subject to being drawn off manually through the valves S, T and U, whence it goes into the main drain line to the auxiliary pit. It may be noted that in case it is found expedient to employ some sort of coagulating agent, it could be introduced through a suitable injection valve 8 near the bottom of the syphon 57 leaving the treating unit, giving it more time to thoroughly mix with the water before it reaches the settling baffles B in the water processing unit. The water passes downwardly through the baffles and finally leaves the lower portion of the tank through a drain 11 in the bottom of the dished partition at 11a. Here the water has the possibility of two routes: if the lower filter chamber L' is in use, it will pass out opening 11, thence through the valve D which is open and back into the filter chamber at 12 through a suitable screen N' preferably of galvanized metal. Thence it passes through filter (possibly excelsior) L' and thence out through the galvanized screen M' and the opening 13.

The salt water then enters injection syphon at 14 going up through the valve E which is open and on up to adjusting part of syphon at 58. Here the water trickles down the gas-filled part of the syphon at the right to its level as determined by the float control O'. At this point it may be discharged into the drain line to a pit through pipes 16, valve H, line 46, and pipe 56 (Fig. 3), or it may enter the pump H' (if pump is needed) whence it goes to a battery of parallel flannel bag filters A' and B'. Either or both filters may be used, one being used while the other is open for cleaning or inspection. If it is desired to put the water into the auxiliary pit after it leaves the filters, then valve O should be closed and valve N open, and vice versa, if the water is to go to injection tubing T'.

The water enters the injection tubing T' at 19 whence it is discharged at a point about 100 ft. below the static level of the water in the well casing S', this point being indicated at 20. In order to keep the tubing full of water at all times, thereby preventing the formation of vacuum and cascading of the water, yet allowing the water to flow through it as needed, the hydraulic tubing valve shown on the bottom of the tubing was designed. It consists essentially of a valve W, a seat W², a stem guide W³, a stem W⁴, a diaphragm (rubber or metal) X² and a water pressure chamber R' containing a spring P' whose tension may be adjusted as desired. The chamber R' is connected to gas pressure at top of well by a ¼ inch line 59 leading to the top of casing. A check valve P'' at the bottom of chamber R' serves to permit constant liquid level maintenance in the gas pressure line 59, liquid pressure being supplied by a static column of water in the casing S'. Pressure on this column is supplied from a gas line 40a leading from pilot valve 39 operated by float O' which connects with the pipe 59 at 40. The amount of this pressure is determined by adjustment of regulator V which supplies constant pressure for which it is set. When the float O (Fig. 2) is down, indicating that no water is to be injected at that instant, the pilot valve 39 actuated by the float is open, thereby supplying full pressure to the feed line 40a which in turn transmits pressure through hydraulic column in ¼ inch string of pipe 59 to the chamber R' which column transmits pressure to the diaphragm X² and this with the aid of spring P' acts to close valve W and to prevent bleeding of water and emptying the string of tubing T'. Should some water be produced and the float O' rise, then the pilot valve 39 on the gas line 38 closes off the gas supply coming from regulator V, thereby exhausting pressure to atmosphere through the regulator, thus releasing pressure on ¼ inch feed line 40a which in turn lessens the pressure of column of water in tubing T', allowing discharge of water under pressure of column above it in casing, which under prearranged conditions would be approximately 100 ft. Thus there is automatically maintained pressure on the water at all times, even during shut-down periods.

Should the valve W become worn and leak or should some foreign substance of insoluble nature become lodged in its seat W², then provision must be made for offsetting any damage done by leakage of water therethrough, and the consequent emptying of part of the column of tubing. Also, should the static level in the casing be lowered, provision should be made to prevent formation of vacuum in the upper portion of the casing S'. This is accomplished by providing oxygen-free gas at approximately 5 lbs. pressure always available for both the casing S' and the tubing T'. This gas, along with the gas for the float control O' may be taken from the source of residue gas commonly available in most oil fields. The gas for the casing and tubing may be rendered oxygen-free (as most residue gas contains air) by passing it through an oxygen absorbing solution Y in the chamber Z. From the chamber Z the gas passes out at 34 through the regulator 35, where it is stepped down to 5 lbs. pressure for use in both casing and tubing. Thence the gas branches off and passes through check valves and enters the casing and tubing at 36 and 37 respectively. Pressure gauges here indicate pressure on both tubing and casing. Gas for float control O' does not have to be passed through treating chamber or pit Z, since it is exhausted to the atmosphere as it is at pilot 39 at level control O' and consequently is supplied direct through line 38. The float control O' also operates the electrically driven pump H' (if pump is needed) through a take-off pressure line from the line 40a leading to the chamber R'. When the float O' acts through the pilot valve 39, line 40a and pipe 59 to open valve W at bottom of injection tubing 59 it simultaneously turns or operates switch (not shown) on the electrically driven injection pump H'.

It should here be noted that during the operation if the pressure gauge on the tubing T' only shows undue increase while the gauge on the casing is unaffected, this indicates that valve at bottom of tubing has failed to open or that there is some obstruction in the orifice seat of the valve. If, however, both gauges on tubing and casing show corresponding exceptional increases, this is an indication that the porous formation at the bottom of the disposal wall is plugged or is plugging up.

The valves J, K, L and M on battery of flannel filters A' and B' are employed simply for the purpose of putting either one of the filters out of service. In case the filter chamber L' at the bottom of the water processing unit 10a must be inspected or cleaned out, valves D and E should be closed, and valve F opened, thus by-passing the chamber L'. If it is desired to by-pass the syphon 58 on the system at any time, the valve G leading to pipe 16 should be opened. If it is desired to pass liquid directly from the water processing unit to the auxiliary drain pit at any time, valve I on the line leading to the filters should be closed and the valve H opened. When found desirable to simply backwash the filter chamber L', discharging the water into the drain to an auxiliary drain pit, valves D, P and G are closed and valves E, F and Q opened, thus allowing the water to pass out at 15, then down to the point 14 then back into bottom of filter at 13 and out top of filter at 12, whence the liquid passes down into drain line at 45. The valve arrangement is very flexible and permits an operator to do anything within reason to lower the filter section.

Gas is taken off the water processing unit 10a at 30, where it enters the gasoline plant vacuum line 28a and is equalized with the emulsion treater. The syphon 58 is equalized for gas by means of a flexible connection 32.

The valve Q' in pressure line 59 just below the point 40, Fig. 3, is actuated by gas pressure from the supply line at 38. Gas pressure of a predetermined amount is needed to keep the line 59 open to the chamber R'. If the pressure should fail on the gas supply, then valve Q' would automatically close, due to a spring action built in it (not shown), thus maintaining the same pressure on the diaphragm $X^2$ that existed at the moment the pressure on the gas supply was reduced, thus assuring that water level in the tubing would not be lowered very much before the pressure would become insufficient to force valve W open against sealed pressure on the diaphragm $X^2$, thus holding most of water in tubing with 5 lbs. pressure on it as supplied by the gas connection at 36 at the top of the tubing.

The system is preferably composed of units made from rolled steel plates of suitable thickness for the required working pressure, and welded according to A. P. I.—A. S. M. E. specifications. All the valves in the system are or may be standard working pressure valves, and the fittings and piping are also preferably of standard make.

The heating arrangement of the system offers advantages over other closed type systems in that the fire tube units G are of preferably sufficiently small dimensions as to enable their easy removal and replacement in case of individual failure without having to remove the entire battery of tubes, without resorting to hazardous welding, since the tubes are rolled in as in most boilers. The improved arrangement provides maximum economy in labor and materials. Also this tube arrangement provides easy removal of soot from tubes, simply by swabbing with a brush from the outside. Also the firebox $F^5$ as shown in Fig. 5 is less subject to igniting heavy accumulated gaseous vapors that sometimes roll off from stock tanks, due to its elevation. It may also be provided with a peephole so that the operator may inspect the fire or light the burner from the ground, without having to look directly into the mouth of the firebox or place himself in that vicinity.

Particular attention is directed to the string of tubing T', the size of which is dependent on the volume of water to be handled per hour and upon the size of the casing in the injection well. This tubing and also the valve arrangement W etc., at the bottom thereof, are of particular importance. The object of this string of tubing is to provide a means of injection below the static water level in the casing, and provide a water filled, pressure system at all times whether injecting or not. The purpose of the valve referred to above is to provide an operative means at the bottom of the tubing which may be opened or closed at will from the top of the tubing without having to enter the system, and which may be automatically operated by the float control O' previously described. The primary object of this valve is to assure constant maintenance, as nearly as possible, of a completely water filled string of tubing that will permit passage of water only when the valve is actuated by the float control.

While the inventor is aware of and familiar with the various types of equipment for the treating of oil from wells, in the present invention there are provided certain advantages over conventional open-type equipment, among which may be mentioned the fact that the arrangement and construction presented herewith calls for outlay of considerably less expensive equipment and less of equipment, and the system is completely salvable, and simple to dismantle, move and re-install. The equipment is also not subject to corrosion, due to the exclusion of air, and this fact avoids the necessity of using corrosion resisting pipe or materials anywhere in the system. By the use of the present system an operator may work an abandoned well, due to the system's adaptability to operate under pressure. As such a well might not be properly situated to be worked with the conventional open-type system, a saving in the cost of drilling a special injection well results. The system is automatic and simple in its operation and eliminates necessity for and cost of using chemicals for killing algae or bacteria, and in some cases, will eliminate the need for precipitating chemicals, which require expensive automatic equipment and involve a recurring expenditure of money for chemicals used. By properly situating the system at a high elevation and by carrying necessary pressures up to 20 lbs. it is possible to postpone for a long time the requirement of some sort of pump to inject water into the tubing or well. Finally, by employing pressure in the system throughout, and especially after it leaves the last filter, and by using several inexpensive filters for factors of safety, this system offers more assurance of not plugging the well than does the conventional open-type system.

It will be understood, also, that the present disclosure is susceptible of changes, variations, alterations and modifications apart from that shown in the structure, and which would be within the spirit of the invention and within the scope and meaning of the appended claims.

I claim:

1. In a liquid disposal system for oil fields and the like, including a disposal well having a porous formation at the bottom thereof and having a normal static liquid level; tubing in said well having an outlet communicating with said porous formation and located below the static level, a source of liquid communicating with the upper portion of said well, and means for maintaining a substantially continuous column of liquid from said porous formation to said source; said means including a valve for controlling the flow of liquid through said outlet from said tubing to said porous formation, means actuated by the raising of the liquid level in said source to a predetermined point for opening said valve, and means for closing said valve when the liquid level of said source falls below a predetermined point.

2. In a liquid injection system for oil fields and the like, including an injection well having a porous formation at the bottom and a normal static liquid level; tubing projecting into the well, a source of liquid communicating with the upper portion of said tubing, said tubing having a liquid outlet below the static level communicating with said porous formation, a fluid pressure chamber at the lower portion of said tubing, a fluid pressure line communicating with said pressure chamber, a valve controlling said outlet adapted to be automatically opened or closed according to the amount of pressure supplied by said fluid pressure line to said pressure chamber, and means controlled by the liquid level of said external source for regulating the pressure in said fluid pressure line.

3. In a liquid injection system for oil fields and the like including an injection well having a porous formation at the bottom and a normal static liquid level; tubing projecting into the well for supplying controlled hydrodrastic pressure, an external source of liquid having a variable level, a pipe line connecting said source with said tubing, said tubing having a fluid pressure chamber at the bottom thereof, a liquid outlet above said pressure chamber and below the static liquid level, communicating with the porous formation, a pressure line communicating with said pressure chamber, a valve controlling said outlet and adapted to be automatically opened or closed according to the pressure supplied by said pressure line, and means controlled by the level of liquid at source for regulating the pressure in said pressure line, whereby the valve is opened when the liquid level of said source reaches a predetermined level, and is closed when the level falls to a predetermined level.

4. In a liquid disposal system for oil fields and the like including a disposal well having a porous formation at the bottom thereof and a normal static liquid level; tubing extending into the well having an outlet below the static level communicating with said source a control valve for said outlet, and means for automatically opening and closing said valve; said valve opening and closing means including a pressure chamber located in said tubing below said outlet, a fluid pressure line communicating with said chamber, means controlled by variations in the liquid level of said source for increasing or decreasing the pressure in said pressure line and in said pressure chamber, and means for actuating said valve in accordance with said pressure variations whereby said valve is opened to pass liquid through said outlet to said porous formation when the liquid level in said source reaches a predetermined level, and closes when the liquid level of said source falls to a predetermined level.

5. In a liquid injection system for oil fields and the like, including an injection well having a porous formation at the bottom thereof; tubing extending into said well having an outlet communicating with said porous formation, a source of liquid communicating with the upper portion of said tubing, and means for maintaining a substantially continuous column of liquid from said porous formation to said source; said means including a valve for controlling the flow of liquid through said outlet, and means for actuating said valve to allow liquid to flow through said outlet when the liquid level of said source reaches a predetermined level, and to cut off the flow when the liquid level falls below a predetermined point; said valve actuating means including a pressure chamber at the lower portion of said tubing having a partition located below said outlet, a variable fluid pressure line communicating with said pressure chamber, and means for automatically varying the pressure in said pressure line and pressure chamber in accordance with variations in the liquid level of said source; said valve having a stem portion extending through said partition into said pressure chamber and means including a diaphragm actuated by variations in pressure in said chamber for periodically reciprocating said stem portion to open or close the valve.

6. In a liquid disposal system for oil fields and the like, including a disposal well having a porous formation at the bottom thereof and having a normal static liquid level; tubing extending into said well, spaced from the outer wall of the well and having a controlled liquid outlet below the static level communicating with said porous formation, a source of liquid communicating with the upper portion of said tubing, a partition in said tubing below said liquid outlet, a pressure chamber below said partition, a variable fluid pressure line communicating with said chamber, means for varying the pressure in said line and in said chamber in accordance with variations in the liquid level of said source, and control means actuated by variations in the pressure in said chamber for allowing liquid to flow through said outlet to said porous formation when the liquid level of said source reaches a predetermined level, and for cutting off flow when the liquid in said source falls to a predetermined point said control means including a reciprocating valve adapted to coact with a seat in said tubing above said opening, having valve stem projecting through said partition into the pressure chamber, and means for reciprocating said valve stem in accordance with predetermined variations of pressure in said pressure chamber, to thereby open or close the valve.

7. A combined emulsion treating and brine injection system for oil fields and the like, comprising emulsion treating means for separating water, oil and gas from an emulsion including an inlet for emulsion to be treated, and separate outlets for the separated gas, oil and water; a brine injection well having a porous formation at the bottom thereof, well tubing projecting into the well for supplying controlled hydrostatic pressure thereto, a pipe line connecting said water outlet with said well tubing, said well tubing having a pressure chamber at the bottom thereof, a water outlet above said pressure chamber and leading to the porous formation, a fluid pressure line communicating with said pressure chamber, valve means controlling said last-named outlet and adopted to be automatically opened or closed according to the pressure supplied by said fluid pressure line, and means controlled by the amount of water coming from said emulsion treating means for regulating the pressure in said fluid pressure line.

8. A combined emulsion treating and brine injection system for oil fields and the like as set forth in claim 7, wherein the emulsion treating means includes separate closed emulsion treating, gas separating and water processing vessels.

9. A combined emulsion treating and brine injection system for oil fields and the like as set forth in claim 7, wherein the fluid pressure line is supplied with residue-gas, and branch gas pipe lines from the pressure line head to the top of the well tubing and casing respectively, and means are provided for separating oxygen from the gas passing through said branch pipe lines.

10. A combined emulsion treating and brine injection system for oil fields and the like, comprising an emulsion treating tank provided with an external heat exchange unit including means for preheating an oil and water emulsion; a gas separating tank separate from the emulsion treating tank and having a pipe leading from the preheating means, a gas outlet pipe leading from the gas separating tank, a liquid return pipe leading from the gas separating tank to the bottom of the emulsion treating tank, heating and baffling means in said emulsion treating tank for separating the oil from the water contained in the emulsion, an oil outlet near the top at the treating tank, means for cooling said oil prior to its passage to storage, means in the bottom of the treating tank for filtering the water separated from the emulsion, a water outlet leading from the bottom of the treating tank; a water processing vessel separate from the emulsion treating tank, tubing, including a syphon connecting said water outlet with the water processing vessel intermediate its ends, baffles in said vessel for separating out any remaining oil, filtering means near the bottom of the vessel, an oil outlet above the water inlet, a water outlet at the bottom; a brine injection well, a tubing connecting the water outlet with said brine injection well and means for controlling the hydrostatic pressure within the brine injection well.

11. An emulsion treating and brine injection apparatus comprising an emulsion treating tank; an independent gas separating tank, an inlet pipe to said gas separating chamber for supplying an oil and water emulsion thereto, means associated with the emulsion treating tank for preheating the emulsion prior to entry into the gas separating tank, a gas offtake from said separating tank, a liquid outlet leading from the separating tank to the emulsion treating tank, means in the emulsion treating tank for heating and baffling the emulsion to effect a separation of oil and water, said treating tank having an oil offtake pipe from the tank leading to storage, and a water outlet; a water processing tank for removing any remaining gas, oil, sludge and the like from the water, pipe connections between said water outlet and the processing tank, said processing tank having a gas outlet, an oil outlet, sludge outlets, and a water outlet; a brine injection well, well tubing extending into the well and forming openings near the bottom thereof communicating with the well, piping connecting the water outlet of said water processing tank with the upper portion of said well tubing, a pressure chamber in the lower portion of said tubing, a pressure pipe communicating with said pressure chamber, valve means above said pressure chamber controlling the outlet to the well, and means controlled by the amount of water drawn off from the water processing tank for controlling the pressure in said pressure pipe.

12. A combined emulsion treating and brine injection system for oil fields and the like, comprising (1) an emulsion tank having a heat exchange jacket providing annular spaces for flow of liquid, a plurality of spaced perforated dispersion-baffle plates in the tank, a plurality of flue pipes, a partition providing a free water removing and heat salvaging chamber in the lower portion of the tank, a perforated spreader extending diametrically across said partition, an inflow opening and an outflow opening in said heat exchange jacket, (2) a gas separating tank separate and above said emulsion tank, a screened filter section in the lower end of the emulsion tank, a pipe for conducting gas-separated oil from said gas separating tank to the heat salvaging chamber, (3) a water processing tank having piped and valved communication with the emulsion tank, and (4) a brine injection well communicating with the water processing tank; said system including special pressure valve means and valve and filter parts with syphons, and means whereby a constant static pressure is maintained throughout the apparatus.

13. An emulsion treating and brine injection system as set forth in claim 12, said gas separating tank having a central enclosure with spaced upwardly-directed baffles therein said enclosure being open at the top and provided with a pipe to conduct gas to a vacuum line and including a drain outlet, a plurality of spaced pipes one each being at the lower end of each baffle and extending downwardly to conduct the oil and water to the lower end of the separator.

14. An emulsion treating and brine injection system as set forth in claim 12, said water processing tank including a plurality of baffles in staggered relation one above the other, a partition in the lower part of said processing tank providing a separate filtering chamber adapted to be isolated for cleaning or inspection without interrupting operation of upper part of the processing tank, screens and a filter medium in said filter chamber, each of said baffles including a piped outlet at their lower ends for sludge removal, an outlet for said filter chamber communicating with the flow line of the system, and an inlet with a spreader in the upper part of the processing tank for admitting liquid or water from said emulsion tank, a syphon intermediate the emulsion and processing tanks and having operable communication therewith, and an opening in the top of the processing tank and communicating with a vacuum line for passage of gas accumulated in the processing tank.

15. An emulsion treating and brine injection system as set forth in claim 12, wherein the flue pipes of said emulsion tank are of relatively small dimensions and capable of removal and replacement for repairs without dismantling the entire battery of tubes.

RANSOME W. ERWIN.